Patented May 1, 1928.

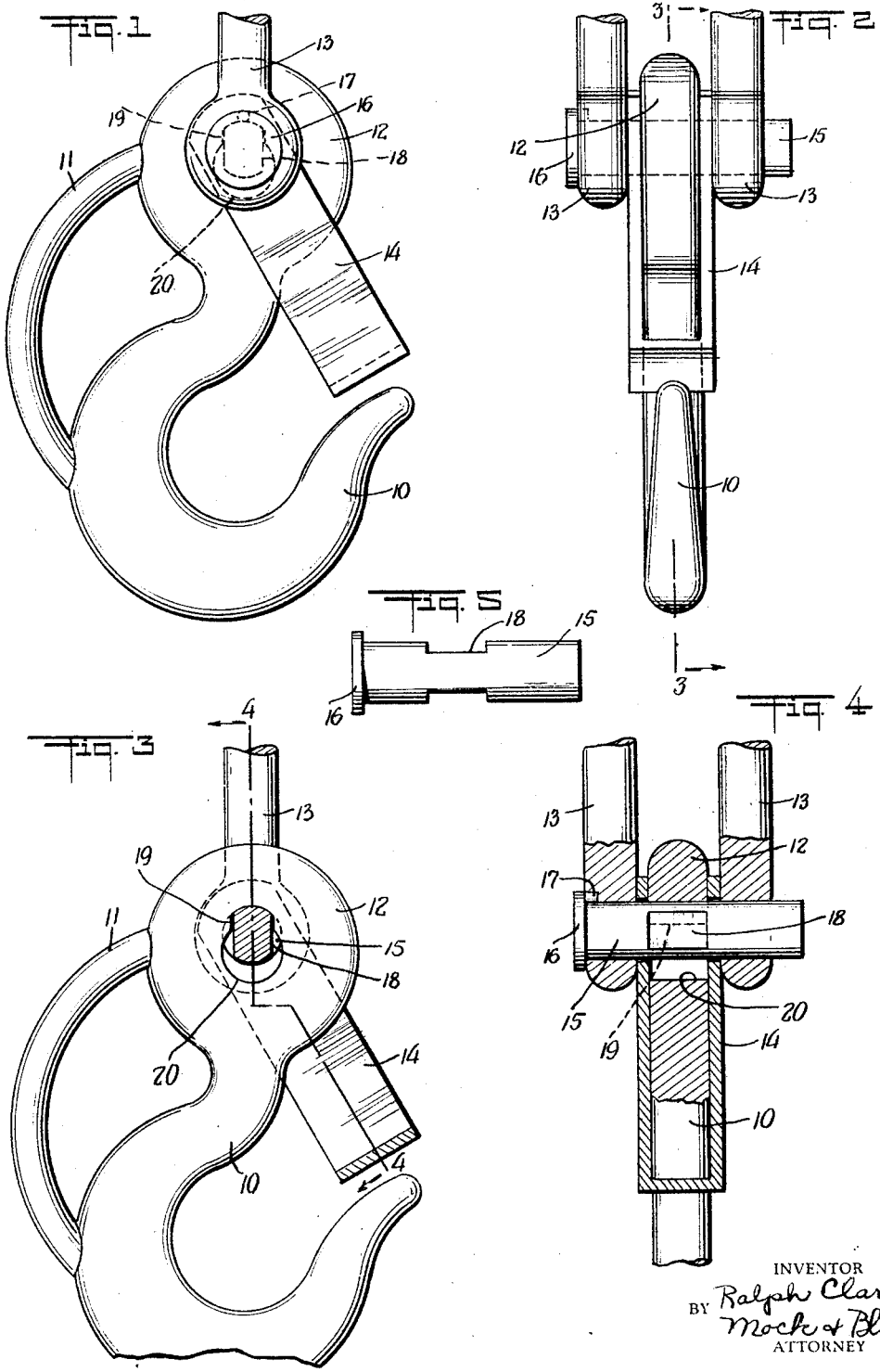

1,667,927

UNITED STATES PATENT OFFICE.

RALPH CLARKE, OF NEW YORK, N. Y.

SAFETY HOOK.

Application filed July 12, 1927. Serial No. 205,064.

My invention relates to a new and improved safety hook.

One of the objects of my invention is to provide a safety hook with a simple and efficient latch device for holding in position any object carried by the hook.

Another object of my invention is to provide a device which automatically falls into position and is automatically held in position by the weight thereof.

Another object of my invention is to provide a device which is extremely simple and efficient in construction and which will have a minimum number of parts.

Other objects of my invention will be set forth in the following description and drawings which illustrate a preferred embodiment thereof, it being understood that the above general statement of the objects of my invention is intended to merely generally explain the same, and not to limit it in any manner.

Fig. 1 is a side elevation.

Fig. 2 is a front elevation.

Fig. 3 is a section on the line 3—3 of Fig. 2.

Fig. 4 is a section on the line 4—4 of Fig. 3.

Fig. 5 is a side elevation of the pivot pin.

As shown in Fig. 1, the device is provided with an upper support having two arms 13, said upper support being of the usual type and being connected to the chain of a crane or the like. As shown in Figs. 2 and 4, the said support arms 13 are provided with circular openings at the bottoms thereof. A pin 15 is provided with enlarged cylindrical end portions which fit into the circular openings at the bottoms of the arms 13. The pin 15 is provided with a head 16 which has a lug 17 and said lug 17 engages a suitable recess in one of the arms 13 so as to prevent the pin 15 from turning. The pin 15 is provided with a reduced central portion 18 which has flat and parallel walls as clearly shown in Figs. 1 and 3.

The hook 10 is provided with an upper enlarged head 12 and said head 12 has an eye consisting of a lower eye-portion having an arcuate wall 20 and an upper eye-portion having flat and parallel walls 19. The flat reduced portion 18 of the pin 15 is adapted to support the hook 10 which is located between the arms 13 as shown in Figs. 2 and 4. The width of the hook is equal to the width of the reduced portion 18 so that the said hook rests between the enlarged ends of the pin 15 and is prevented from shifting in any direction save, of course, that it may be moved upwardly by the hand of the operator whenever desired.

The hook 10 is provided with a handle 11.

The device is provided with a latch member 14 which is connected to the shackle or support arms 13 in any suitable manner as by welding or the like. Hence, the latch member 14 tends to assume the position shown in Figs. 1 and 3, for example.

Hence, the latch 14 remains in a position in which it can obstruct the mouth of the hook 10 and prevent any object held by the hook 10 from falling off until the hook 10 is turned away from the latch 14.

This can be accomplished when the heavy weight which is supported by the hook 10 has been deposited upon some suitable support, such as the ground or the like, so that the weight no longer forces the hook 10 into the vertical position.

The operator can then raise the hook 10 to enable it to be turned away from the latch 14 so as to release the chain or other means whereby the weight is held upon the hook 10.

I have shown a preferred embodiment of my invention, but it is clear that numerous changes and omissions could be made without departing from its spirit.

Claims.

1. A safety hook comprising an upper support, a hook mounted upon said support and vertically movable with respect thereto, the said support and the said hook having cooperating guide portions adapted to prevent the turning of said hook with respect to said support in the lower position of said hook and adapted to permit the turning of the said hook with respect to the said support in the upper position of the said hook, and a latch member fixed to the support and adapted to obstruct the mouth of the said hook, said hook being freely turnable away from said latch in the upper position thereof, said hook resting solely on the guide portion of said support in the lower position thereof.

2. A safety hook device comprising a support having a bearing pin connected thereto, said bearing pin having an intermediate portion of non-circular lateral contour, a hook having an eye mounted upon the said bearing pin, said eye having an upper portion of non-circular contour and having a lower portion which projects below the bottom of the said bearing pin so that said hook can be raised with respect to said bearing pin, and a latch member fixed to the said support and adapted to obstruct the mouth of the said hook, said hook being freely turnable away from said latch in the upper position thereof, said hook resting solely on the guide portion of said support in the lower position thereof.

3. A safety hook device comprising a support having separate arms, a transverse bearing pin non-revolubly mounted in said arms, said bearing pin having a reduced central bearing portion having flat side walls, a hook having an eye separated into an upper eye-portion and an enlarged lower eye-portion, the upper eye-portion having flat walls corresponding to the flat walls of the said bearing portion and the lower eye-portion extending below the said bearing portion so that the said hook can be raised from said bearing portion to be turned with respect thereto, and a latch member fixed to the arms of the said support and adapted to obstruct the mouth of the hook when said hook is in its lower position, said hook being freely turnable away from said latch in the upper position thereof, said hook resting solely on the guide portion of said support in the lower position thereof.

In testimony whereof I affix my signature.

RALPH CLARKE.